Patented Oct. 31, 1922.

1,433,655

UNITED STATES PATENT OFFICE.

ALEXANDER S. RAMAGE, OF DETROIT, MICHIGAN, ASSIGNOR TO INTERNATIONAL COLOR & CHEMICAL COMPANY, INCORPORATED, OF DETROIT, MICHIGAN, A CORPORATION OF NEW YORK.

PROCESS OF RECOVERING SUCROSE FROM SOLUTIONS.

No Drawing. Application filed July 22, 1919, Serial No. 312,640. Renewed April 13, 1922. Serial No. 552,228.

*To all whom it may concern:*

Be it known that I, ALEXANDER S. RAMAGE, a citizen of the United States, residing at Detroit, in the county of Wayne and State of Michigan, have invented certain new and useful Improvements in Processes of Recovering Sucrose from Solutions, of which the following is a specification.

This invention is a novel process for the separation and recovery of sucrose from impure solutions, and more particularly from beet or cane molasses. According to the invention the sucrose is precipitated as lead sucrate by direct reaction with lead hydroxid in excess, and the mixed percipitate thus obtained is treated in such manner as to yield on the one hand a sucrose solution wholly free from lead, and on the other hand a lead hydroxid suitable for use in a continuation of the process. The process is therefore essentially cyclical in character, in that the lead compounds are quantitatively regenerated.

The operating conditions will vary somewhat according to whether the molasses or other sucrose-bearing solution is derived from beet or sugar cane. In the former case I may proceed as follows, it being understood that the invention is not limited to the employment of the precise proportions mentioned by way of illustration, or to the exact operating conditions hereinafter detailed.

2600 pounds of beet molasses containing about 50% of sucrose is diluted with 25–50% of water and is then thoroughly agitated with a paste containing 2700–2800 pounds of lead hydroxid ($PbO_2H_2$), preferably together with about 25–50 pounds of an alkali hydroxid, such as caustic potash or caustic soda. The agitation is continued until the mass acquires a semi-solid consistence after which it may be allowed to stand for a few hours in order to complete the reaction. This precipitation may be carried out at normal or higher temperatures, up to about 70° C. At the conclusion of the reaction sufficient cold water is added to transform the mass into a pulp which is then pumped to the filter presses.

The mother liquor or filtrate contains the non-precipitatable non-sugar content of the molasses, including the mineral salts, and may be directly concentrated for the recovery of its potash content or for use as a fertilizer.

The precipitate, after thorough washing with cold water, consists essentially of lead sucrate and lead hydroxid, together with any precipitatable non-sugars, and is suspended in a liquid bath, preferably a dilute syrup from a previous operation, and is carbonated therein, preferably at about 70° C., the passage of the carbon dioxid being continued just so long as the polarization of the liquid increases, that is to say so long as sucrose is set free. At the completion of this operation the lead carbonate is filtered out, yielding a filtrate which is a substantially pure sucrose solution containing traces only of lead and a precipitate which, in so far as its metallic salt contents are concerned, is essentially a basic carbonate of lead, corresponding more or less closely according to the operating conditions to the formula $2PbCO_3.PbO_2H_2$.

The sucrose solution obtained as above is agitated with approximately ½% by weight of calcium hydroxid, heated to about 70° C., and again carbonated, whereby any residual traces of lead are removed and a solution is obtained from which the sucrose may be directly recovered in merchantable form by the usual crystallization methods. Should the precipitate contain more than traces of lead it may be treated by any suitable method for its recovery.

The basic carbonate of lead obtained as above described is now re-converted into the hydroxid for re-use in the process. This is preferably done as follows:

The basic carbonate from several batch operations as above described is distributed to a series of wooden tanks each provided with an agitator, each tank receiving approximately 3000 pounds dry weight of the precipitate. To the precipitate in the first tank I add an excess of caustic soda above the amount theoretically required to convert the carbonate component into hydroxid. In practice I find it desirable to introduce the caustic soda in the form of a 2.5–5% solution, and in quantity equivalent to a 30–50% excess above the theoretical proportions above mentioned. The reaction proceeds more rapidly at temperatures above normal and in practice I prefer to agitate the mass at a temperature of about 70-80° C. for a period of approximately one hour. At the end of this time the solid contents of the tank consist substantially of lead hydroxid, and may be separated from the solution, washed, and utilized directly in a repetition of the molasses-treating step of the process, precisely as described above.

The solution contains sodium carbonate, together with approximately 10% of the lead content of the first tank, in the form of sodium plumbite usually with some excess of uncombined caustic soda. This solution is brought into presence of the basic carbonate in the second tank, and is agitated therewith in the cold. Thereby the sodium plumbite is decomposed, its lead content being precipitated in the form of lead hydroxid. Any excess of caustic soda contained in the solution, together with that liberated by the decomposition of the plumbite, reacts upon the basic lead carbonate in the second tank to convert the same into hydroxid. The solution resulting from this treatment should consist essentially of sodium carbonate, but as a matter of precaution, it may be introduced into presence of the basic carbonate in the third tank in series, and agitated therewith, in order to remove any traces of caustic soda or plumbite which may be present. This solution is then withdrawn, and may be causticized with lime in the usual manner, yielding caustic soda which returns to the cycle at the appropriate point.

The contents of the second tank, which by the above treatment have been partially converted into hydroxid, are then treated with caustic soda in excess precisely as above described with reference to the contents of the first tank in series; and the resulting hydroxid used in the sucrose precipitation. It will be understood of course that in computing the excess of caustic soda to be used in the treatment of the second tank, due allowance must be made for the conversion of carbonate to hydroxid which has already occurred through the action of the mother liquor.

In carbonating the sucrate precipitate in order to set free the sucrose, it is desirable to avoid continuing the passage of the carbon dioxid after the polarization value of the liquid has ceased to rise, since under these conditions organic matters other than sucrose which may have been carried down by the precipitated mass pass again into the sucrose solution. It is desirable that such organic matters should be retained by the precipitate at this stage, since they are dissolved therefrom in the subsequent treatment with caustic soda, and pass ultimately into the lime mud resulting from the re-causticizing step of the process.

In the case of molasses derived from sugar cane the general outline of the process is as described above, but owing to the fact that such molasses contains large quantities of invert sugars which are readily decomposed in alkaline solutions more particularly at elevated temperatures it is necessary carefully to observe certain precautions as follows:

1. The entire operation of precipitating the sucrose is preferably carried out at normal or lower temperatures. To this end the lead hydroxid is introduced comparatively slowly, and with constant agitation, whereby the heat from the exothermic reaction is dissipated. Preferably the conditions should be such that the temperature will not at any time rise more than 5 to 10° above normal.

2. The addition of caustic alkalies with the lead hydroxid is omitted. In the case of the beet molasses this practice is adopted in order to obviate any reaction between the hydroxid of lead and the mineral salts contained in the solution. Sugar cane molasses being relatively free from mineral salts such addition is not essential. The presence of alkali in the treatment of cane molasses tends to render the precipitates slimy and greatly increases the filtration difficulties, besides increasing the tendency to decomposition of the invert sugars.

3. In the treatment of cane molasses it is essential that the molasses should be substantially free from organic acids, such as acetic and lactic acids, which form soluble lead salts. Preferably therefore the molasses is treated almost immediately after its production, and before fermentation has intervened. Or if this is impossible, fermentation should be prevented by the addition of suitable antiseptics or preservatives, such for example as formaldehyde.

4. In the treatment of cane molasses it is desirable in order to secure the maximum yields of sucrose to employ a decidedly larger excess of lead hydroxid than is necessary with beet molasses. Thus in the case of beet molasses the portion by weight of lead hydroxid to the sucrose content of the molasses will be approximately 2 to 1, as in the specific example mentioned above; whereas in the case of cane molasses it has been found desirable in practice to employ a ratio (lead hydroxid to the sucrose content of the molasses) of about 3 to 1.

5. The sucrose-bearing solutions derived from cane molasses contain materially larger percentages of soluble lead compounds, owing presumably to the oxidizing effect of the lead hydroxid on the glucose: accordingly, therefore, correspondingly larger proportions of lime are required for the elimination of the lead.

All of the plant washings, whether from the treatment of beet or cane sugar products, should be examined for lead; and in case it is found to be present in material quantities these washings should be subjected to carbonation preferably at about 70° C., to separate the precipitate and recover the lead. The same caution applies also to the mother liquors from the lead sucrate precipitation.

I claim:—

1. A cyclical process of recovering sucrose from crude solutions thereof containing also non-sugars, comprising adding to such solutions lead hydroxid in sufficient excess to precipitate the sucrose together with non-sucrose substances; separating the precipitate from mother liquor and liberating the sucrose content of the precipitate by limited carbonation, thereby forming a sucrose-bearing solution and a residual precipitate containing non-sucrose substances; separating the sucrose-bearing solution from the residual precipitate; treating the residual precipitate containing non-sucrose substances with an alkali hydroxid in excess, thereby dissolving non-sucrose material and converting the bulk of the lead-content of the said precipitate into hydroxid; separating the resulting lead hydroxid from the alkaline solution containing non-sucrose material; and introducing said lead hydroxid in excess into a further quantity of crude sucrose-bearing solution in a succeeding cycle of the process.

2. A cyclical process of recovering sucrose from crude solutions thereof containing also non-sugars, comprising adding to such solutions lead hydroxid in sufficient excess to precipitate the sucrose together with non-sucrose substances; separating the precipitate from mother liquor and liberating the sucrose content of the precipitate by limited carbonation, thereby forming a sucrose-bearing solution and a residual precipitate containing non-sucrose substances; separating the sucrose-bearing solution from the residual precipitate; treating the residual precipitate containing non-sucrose substances with an alkali hydroxid in excess, thereby dissolving non-sucrose material and converting the bulk of the lead-content of the said precipitate into hydroxid; separating the resulting lead hydroxid from the alkaline solution containing non-sucrose material; introducing said lead hydroxid in excess into a further quantity of the crude sucrose-bearing solution in a succeeding cycle of the process; and recovering the excess of alkali hydroxid, together with its content of dissolved lead from the alkaline solution containing non-sucrose material, by reacting thereon with an excess of the lead-bearing precipitate from the carbonation.

3. In a process of recovering sucrose from crude solutions thereof containing also non-sugars, the steps comprising subjecting a crude precipitate containing lead sucrate to such limited carbonation that a sucrose solution and a crude precipitate containing lead carbonate and organic bodies are produced; separating the sucrose solution from the precipitate, and treating said precipitate with an alkali hydroxid to dissolve the organic matter and to transform the bulk of the lead compounds into hydroxid.

4. In a process of recovering sucrose from crude solutions thereof containing also non-sugars, the steps comprising subjecting a crude precipitate containing lead sucrate to such limited carbonation that a sucrose solution and a crude precipitate containing lead carbonate and organic bodies are produced; separating the sucrose solution from the precipitate, treating said precipitate with an alkali hydroxid in excess to dissolve the organic matter and to transform the bulk of the lead compounds into hydroxid; and recovering the excess of alkali hydroxid, together with its content of dissolved lead, by reacting thereon with an excess of the lead-bearing precipitate resulting from the carbonation.

In testimony whereof, I affix my signature.

ALEXANDER S. RAMAGE.